United States Patent
Buyanovskiy et al.

(10) Patent No.: US 10,943,390 B2
(45) Date of Patent: Mar. 9, 2021

(54) GRADIENT MODULATED SHADOW MAPPING

(71) Applicant: FOVIA, INC., Palo Alto, CA (US)

(72) Inventors: Georgiy Buyanovskiy, Palo Alto, CA (US); Kevin Kreeger, Palo Alto, CA (US)

(73) Assignee: FOVIA, INC., Palo Alto, CA (US)

( * ) Notice: Subject to any disclaimer, the term of this patent is extended or adjusted under 35 U.S.C. 154(b) by 0 days.

(21) Appl. No.: 16/195,486

(22) Filed: Nov. 19, 2018

(65) Prior Publication Data

US 2019/0156562 A1     May 23, 2019

Related U.S. Application Data

(60) Provisional application No. 62/588,666, filed on Nov. 20, 2017.

(51) Int. Cl.
    *G06T 15/60*     (2006.01)
    *G06T 15/04*     (2011.01)

(52) U.S. Cl.
    CPC .............. *G06T 15/60* (2013.01); *G06T 15/04* (2013.01); *G06T 2215/12* (2013.01)

(58) Field of Classification Search
    CPC ......... G06T 15/06; G06T 15/08; G06T 15/60; G06T 2215/12
See application file for complete search history.

(56) References Cited

U.S. PATENT DOCUMENTS

| | | | |
|---|---|---|---|
| 8,638,331 B1* | 1/2014 | Jarosz | G06T 15/06 345/426 |
| 8,803,880 B2* | 8/2014 | Zhou | G06T 15/506 345/426 |
| 8,884,959 B2 | 11/2014 | Desgranges et al. | |
| 2002/0047843 A1 | 4/2002 | Higashiyama et al. | |
| 2002/0107070 A1 | 8/2002 | Nagy | |
| 2004/0179009 A1 | 9/2004 | Kii | |

(Continued)

OTHER PUBLICATIONS

Akenine-Moller, Thomas and Eric Haines. "Real-Time Rendering." 2nd ed. (2002), pp. 67-75. (Year: 2002).*

(Continued)

*Primary Examiner* — Daniel F Hajnik
(74) *Attorney, Agent, or Firm* — Dentons US LLP

(57) ABSTRACT

Methods and systems related to dynamic visualization of a representation of a three dimensional object are provided. In some embodiments, a computer system accesses a volumetric dataset representing the object. The computer system applies a set of one or more light rays/vectors to the volumetric data-set representing the object and generates a plurality of intermediate images, each intermediate image of the plurality of intermediate images corresponding to each of the one or more light vectors applied to the volumetric data-set representing an object. The computer system generates an accumulated image based on the plurality of intermediate images. The computer system determines whether a user has manipulated the accumulated image within a predetermined amount of time and in accordance with a determination that the user has manipulated the accumulated image within a predetermined amount of time, updates the accumulated image based on a user manipulation.

13 Claims, 6 Drawing Sheets

(56) References Cited

U.S. PATENT DOCUMENTS

| | | |
|---|---|---|
| 2007/0002047 A1* | 1/2007 | Desgranges ............ G06T 15/60 |
| | | 345/426 |
| 2007/0206008 A1 | 9/2007 | Kaufman et al. |
| 2007/0238957 A1 | 10/2007 | Yared |
| 2009/0046109 A1* | 2/2009 | Hamilton, II ....... G06F 3/04815 |
| | | 345/619 |
| 2009/0141027 A1 | 6/2009 | Sato et al. |
| 2011/0012901 A1* | 1/2011 | Kaplanyan ............ G06T 15/506 |
| | | 345/426 |
| 2011/0102435 A1 | 5/2011 | Brabec |
| 2014/0205168 A1* | 7/2014 | Kim ........................ A61B 8/46 |
| | | 382/131 |
| 2015/0379758 A1 | 12/2015 | Koike et al. |
| 2018/0357794 A1* | 12/2018 | Young .................. G06T 11/001 |

OTHER PUBLICATIONS

International Search Report and Written Opinion received for PCT Patent Application No. PCT/US2018/061818, dated Feb. 4, 2019, 8 pages.

* cited by examiner

GRADIENT MODULATED SHADOW MAPPING

CROSS-REFERENCE TO RELATED APPLICATIONS

This application claims priority to U.S. Provisional Patent Application Ser. No. 62/588,666, filed on Nov. 20, 2017, entitled "GRADIENT MODULATED SHADOW MAPPING," which is hereby incorporated by reference in its entirety for all purposes.

FIELD

The present disclosure relates generally to image processing. More particularly, the present disclosure relates to dynamic visualization of a representation of a three-dimensional object.

BACKGROUND

Most volume rendering techniques illuminate a dataset by using only first order rays cast from the eye point into the dataset. Lighting effects generally are calculated by using only three things, the direction of the ray from the eye, the direction from the current point towards the light, and the vector normal (first order gradients in x, y and z space at the current location) or perpendicular to the surface for example. This illumination technique creates first order lighting effects that are interpreted by the human visual system to understand shape. Even though this simple method works, there are many illumination effects not simulated by this idea. For example, surfaces which point towards the light may be seen or displayed "bright" even if they fall in a shadow of another part of the object.

It was discovered in volume rendering, and also computer graphics many years ago, that much more complex calculations can create much more accurate and enriched images by using rays from many light sources and simulating full reflection and refraction each time the light rays hit anything in a scene. Unfortunately this process spawns a large number of new rays each time each of the numerous rays hit anything. The number of rays, and hence the number of calculations, grows rapidly to the point where it becomes impractical to calculate in real time.

SUMMARY

Methods and systems related to dynamic visualization of a three-dimensional (3D) object are provided. In some embodiments, a computer system accesses a volumetric dataset representing the object. The computer system applies a light ray from a light source to the volumetric dataset representing the object. The computer system determines a shadow map based on an amount of light applied at a plurality of points of the volumetric dataset representing the object and a surface normal with a ray direction from the light source. The computer system generates an image based on the volumetric dataset and the shadow map.

In some embodiments, a computer system accesses a volumetric dataset representing the object. The computer system applies a set of one or more light sources to the volumetric data-set representing the object and generates a plurality of intermediate images, each intermediate image of the plurality of intermediate images corresponding to each of the one or more light sources applied to the volumetric data-set representing an object. The computer system generates an accumulated image based on the plurality of intermediate images. The computer system determines whether a user has manipulated the accumulated image within a predetermined amount of time and in accordance with a determination that the user has manipulated the accumulated image within a predetermined amount of time, updates the accumulated image based on a user manipulation.

Various embodiments described herein may be carried out as computer implemented methods, a computer system having a memory and processor for carrying out the described methods, or a computer readable storage medium comprising computer readable instructions for carrying out the described methods.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The details of one or more embodiments of the subject matter described in the specification are set forth in the accompanying drawings and the description below. Other features, aspects, and advantages of the subject matter will become apparent from the description, the drawings, and the claims.

DETAILED DESCRIPTION

The following description sets forth exemplary systems and methods for dynamic visualization of representation a three-dimensional object. It should be recognized, however, that such description is not intended as a limitation on the scope of the present disclosure but is instead provided as a description of exemplary embodiments.

After the introduction of full ray tracing, a method called shadow mapping was introduced as a tradeoff to provide better illumination than simple first order ray casting but without the computation cost explosion of full ray tracing. Shadow mapping creates a volume of shadow points by casting single rays through the volume from the light point, and recording where shadows would occur. This method is much faster than full ray tracing but at the cost of an extra volume of storage. An exemplary shadow mapping technique is described, for example, in U.S. Pat. No. 8,884,959, which is incorporated herein by reference in its entirety. Historically, shadow maps merely calculate when the entire light from the ray is blocked by some structure and no directional information is used to apply shadows.

Dynamic visualization including shadow maps can be improved by considering directional information of the light being applied to the object that is the subject of the dynamic visualization. In some embodiments, a shadow map may be generated based on the amount of light applied at each point of a volumetric dataset representing the object and a surface normal vector. In this way, dynamic visualization according to some embodiments described herein can adjust the shadow map based on how the light interacts with the object. This results in an image that is more realistic and provides greater detail.

Further, dynamic visualization can also be improved by generating a plurality of images of an object including different light sources and averaging them together. In particular, many conventional dynamic visualization systems perform a stochastic monte carlo lighting process to simulate real world conditions. These stochastic monte carlo lighting processes are performed by randomly applying different lighting conditions and reflected surface rays to the object and can result in an image that is not realistic or is lacking detail. Dynamic visualization according to some embodiments disclosed herein provides an accumulated image generated based on several different intermediate images which incorporate the effects of different light sources. These intermediate images are averaged together to create a more realistic image that provides greater detail to the user. Further, more intermediate images incorporating the effects of different light sources may be continually added to provide a gradually improving image that is more realistic than randomly generated images.

Figure 1:
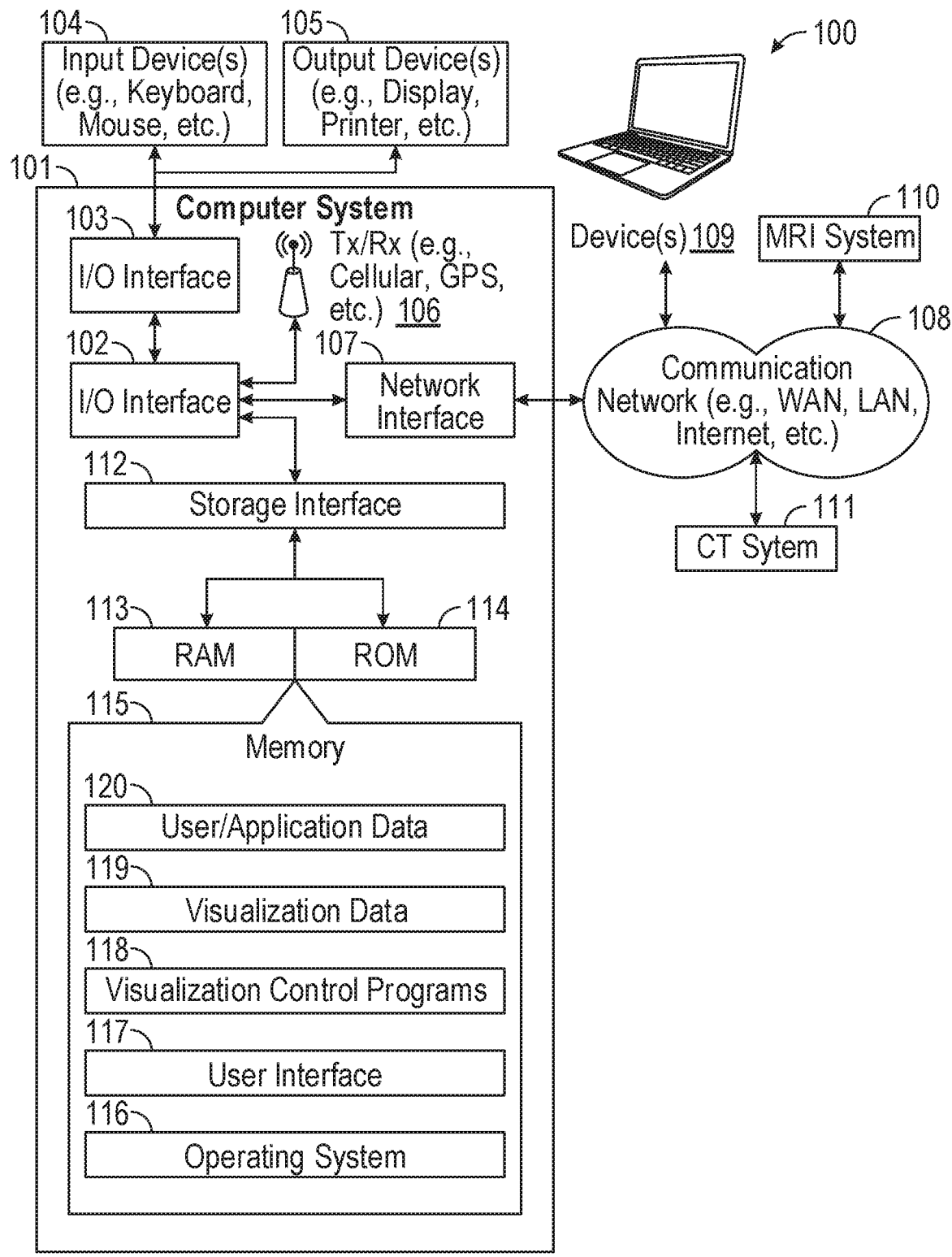
FIG. 1 illustrates an exemplary system for dynamic visualization of a three-dimensional object, consistent with some embodiments of the present disclosure.

FIG. 1 illustrates an exemplary system 100 for dynamic visualization, consistent with some embodiments of the present disclosure. System 100 may include a computer system 101, input devices 104, output devices 105, devices 109, Magnet Resonance Imaging (Mill) system 110, and Computed Tomography (CT) system 111. It is appreciated that one or more components of system 100 can be separate systems or can be integrated systems. In some embodiments, computer system 101 may comprise one or more central processing units ("CPU" or "processor(s)") 102. Processor(s) 102 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 102 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor(s) 102 may be disposed in communication with one or more input/output (I/O) devices via I/O interface 203. I/O interface 103 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 103, computer system 101 may communicate with one or more I/O devices. For example, input device 104 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, electrical pointing devices, etc. Output device 105 may be a printer, fax machine, video display (e.g., cathode ray tube (CRT), liquid crystal display (LCD), light-emitting diode (LED), plasma, or the like), audio speaker, etc. In some embodiments, a transceiver 106 may be disposed in connection with the processor(s) 102. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor(s) 102 may be disposed in communication with a communication network 108 via a network interface 107. Network interface 107 may communicate with communication network 108. Network interface 107 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 108 may include, without limitation, a direct interconnection, local area network (LAN), wide area network (WAN), wireless network (e.g., using Wireless Application Protocol), the Internet, etc. Using network interface 107 and communication network 108, computer system 101 may communicate with devices 109. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 101 may itself embody one or more of these devices.

In some embodiments, using network interface 107 and communication network 108, computer system 101 may communicate with MRI system 110, CT system 111, or any other medical imaging systems. Computer system 101 may communicate with these imaging systems to obtain images for dynamic visualization. Computer system 101 may also be integrated with these imaging systems.

In some embodiments, processor 102 may be disposed in communication with one or more memory devices (e.g., RAM 213, ROM 214, etc.) via a storage interface 112. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, flash devices, solid-state drives, etc.

The memory devices may store a collection of program or database components, including, without limitation, an operating system 116, user interface 117, visualization control program 118, visualization data 119, user/application data 120 (e.g., any data variables or data records discussed in this disclosure), etc. Operating system 116 may facilitate resource management and operation of computer system 101. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 117 may facilitate display, execution, interaction, manipulation, or operation of program components through textual or graphical facilities. For example, user interfaces may provide computer interaction interface elements on a display system operatively connected to computer system 101, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 101 may implement visualization control program 118 for controlling the manner of displaying a plurality of images representing a three dimensional object. In some embodiments, computer system 101 can implement visualization control program 118 such that the plurality of images are displayed with shadows, without shadows, in a predetermined order, by averaging one or more generated images including different light sources, or by continuously adding generated images including a plurality of different light sources. In some embodiments, the plurality of images can represent a volumetric dataset incorporating predetermined or user selected features including a shadow map and/or a plurality of different light sources.

In some embodiments, computer system 101 may store user/application data 120, such as data, variables, and parameters (e.g., one or more parameters for controlling the displaying of images) as described herein. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Figure 2:
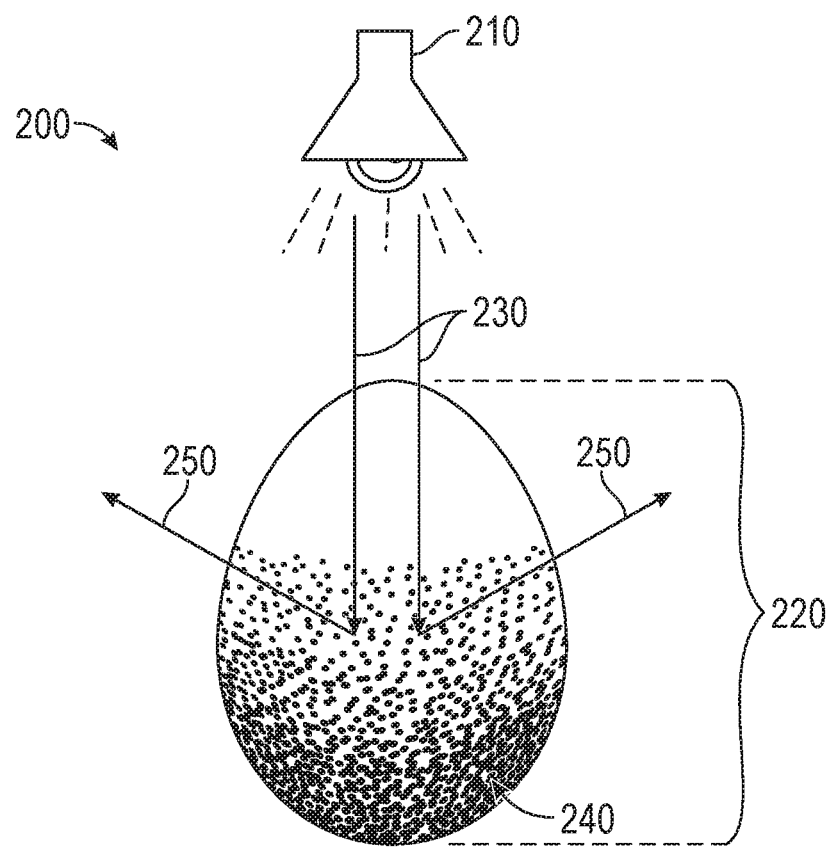
FIG. 2 illustrates an exemplary dynamic visualization of a three-dimensional object based on a volumetric dataset and a shadow map.

FIG. 2 illustrates an exemplary dynamic visualization 200 of a three-dimensional object based on a volumetric dataset and a shadow map. The dynamic visualization 200 may include a light source 210 and an object 220. When the light source 210 is applied to the object 220, one or more light rays 230 are emitted from the light source 210 and interact with the object 220. The interaction between light rays 230 and the object 220 create a shading effect shown as shadow 240. For example, one or more normal vectors 250 may be compared with the one or more light rays 230 interacting with the object 220 to determine the degree of shadow 240.

Shadow 240 is associated with a shadow map for the volumetric dataset representing the object based on the amount of light applied by the light rays 230 and the normal vectors 250. Thus, the computer system may calculate the amount of shadow for each point of the object 220. For example, the amount of shadow may be determined by calculating the dot product of the amount of light applied to each point of the volume and the surface normal vector. These calculations may be performed for each point of the dataset, determining a shadow map for object 220 that represents shadow 240.

The three dimensional object may be, for example, a target lesion, an abnormality of a human body, an aggregation of cells, a nodule, a tumor, a portion of a human body, a portion of an animal body, or a lifeless object. In some embodiments, the three dimensional object may be a portion of a second three dimensional object.

Figure 3:
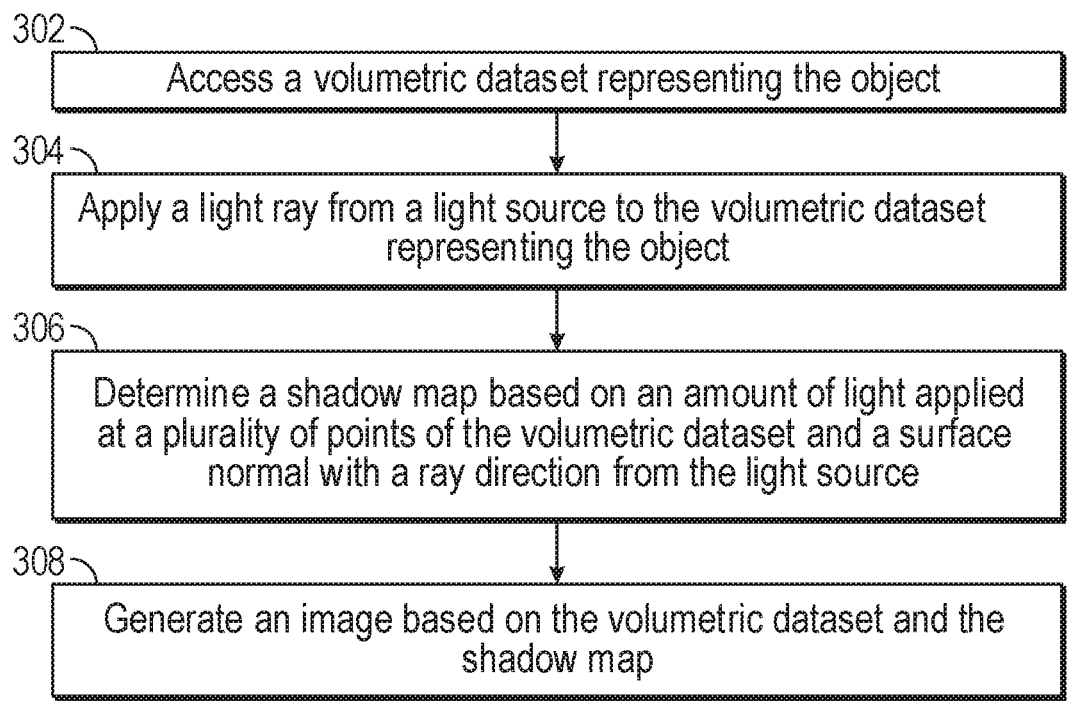
FIG. 3 illustrates a flow chart of an exemplary process for dynamic visualization of a three-dimensional object based on a volumetric dataset and a shadow map, consistent with some embodiments of the present disclosure.

FIG. 3 illustrates a flow chart of an exemplary process for dynamic visualization of a three-dimensional object based on a volumetric dataset and a shadow map, consistent with some embodiments of the present disclosure.

At step 302, a computer system (e.g., computer system 101) can access a volumetric dataset (e.g., visualization data 119) representing a three-dimensional object (e.g., object 220). The volumetric dataset may be previously received by an input device of the computer system, including but not limited to, a scanning device (e.g., CT system 111) or a communication network (e.g., communication network 108) and stored in memory.

At step 304, the computer system can apply a light ray (e.g., light rays 230) from a light source (e.g., light source 210) to the volumetric dataset representing the object (e.g., object 220). In some embodiments, applying the light rays 230 to the object 220 includes applying data representing the light rays 230 to the volumetric dataset. In some embodiments, data representing the light rays 230 is included in the retrieved volumetric dataset. In some embodiments, data representing the light rays 230 may be provided through a user input. For example, the computer system may provide a user with a selection of the orientation of light source 210 such as above/overhead, underneath, or on the side relative to the object. When a user selects one of the provided orientations, the computer system may apply data corresponding to the selected orientation as light rays 230. In some embodiments, data representing the light rays is set to a default orientation (e.g., overhead).

In some embodiments, data representing the light rays 230 includes a brightness or intensity of the light vector 230. In some embodiments, the brightness or intensity of the light rays 230 is predetermined. For example, the intensity of the light rays 230 may be a default value based on the type of object being visualized. In some embodiments, the intensity of the light rays 230 may be provided by a user before or during visualization.

At step 306, the computer system determines a shadow map for the volumetric dataset representing the object. At each point of the dataset the computer system calculates the amount of light applied by the light rays 230. The computer system then calculates a vector indicative of the surface normal with the ray direction from light source 210 (e.g., normal vectors 250). Based on the amount of light and the surface normal vector the computer system may calculate the amount of shadow for each point of the object 220. For example, the amount of shadow may be determined by calculating the dot product of the amount of light applied to each point of the volume and the surface normal vector. These calculations may be performed for each point of the dataset, determining a shadow map for object 220.

At step 308, the computer system generates an image based on the volumetric dataset and the shadow map, similar to the one shown in FIG. 2. The image may be generated with any suitable technique that incorporates the shadow map.

In some embodiments, the volumetric dataset may represent multiple objects and a shadow map may be determined for each object based on how the light vector from the light source interacts with each of the objects. In some embodiments, multiple light sources may be applied to the volumetric dataset and a shadow map for each light source may be determined and applied to the volumetric dataset to generate an image for each light source (it should be noted that some light sources may represent primary light sources, e.g., overhead light sources, and other light sources may represent indirect light sources, e.g., reflections from walls, reflections or transmissions from other objects, or other parts of an object of interest). In some embodiments, the images including the shadow map generated for each light source may be combined into an accumulated image. In some embodiments, light sources may be added after the generation of the image and the computer system may determine a new shadow map and generate a new image based on the added light sources and the original light source.

In some embodiments, the orientation of the light source may change after the image has been generated and the computer system may determine a new shadow map and generate a new image based on the changed orientation of the light source. For example, a user may be provided with an image based on the volumetric dataset and the shadow map which allows the user to select and move the object or the light source to change the orientation of the object with regard to the light source.

Dynamic visualization of a three-dimensional object using shadow maps created with the method described herein results in a more realistic visualization over conventional methods. In particular, as previously discussed, conventional shadow mapping techniques typically only consider if an object is in shadow or not in shadow but do not adjust the shadow based on the amount of the light that applied to the object. This results in a visualization that may lack depth. By creating shadow maps based on the amount of light interacting with each point of a data set and the surface normal with the ray direction from the light the visualization may more accurately reflect how objects in the real world interact with various light sources. In particular, surfaces pointed directly at the light may have no shadows, while those facing the light but pointing towards a different direction may have slight shadows. Further, surfaces facing away from the light at an angle (e.g. 90 degrees) may still be illuminated, but with shadowing greater than surfaces of the object facing the light.

Thus, the resulting visualization is more realistic and provides the user with a better understanding of the object. This is especially important in fields such as medical imaging, which rely on visualization of three-dimensional objects to aid physicians in locating, diagnosing, and treating conditions that are not readily visible to the naked eye. Further, the described methods of shadow mapping and dynamic visualization have a lower computational cost than some conventional methods, which require randomly generating rays and shadows based on those rays to produce a similar image using many more rays and more processing than the described methods, providing the user with greater detail in a faster and more efficient manner.

Figure 4A:
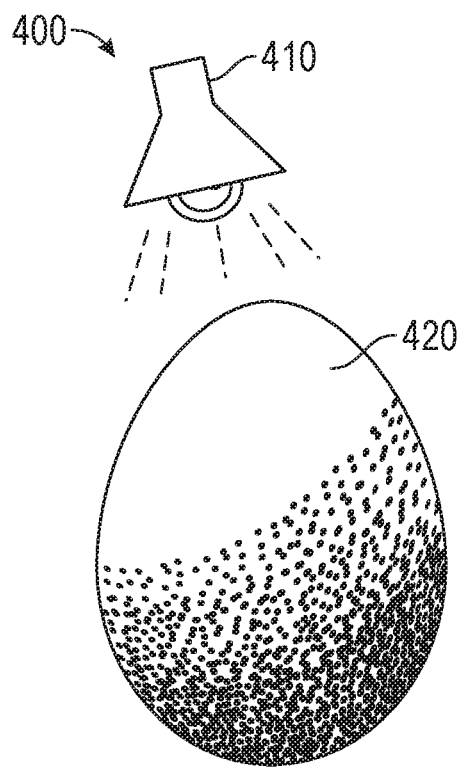
FIGS. 4A-C illustrate an exemplary process for dynamic visualization a three-dimensional object based on a volumetric dataset while a user manipulates the volumetric dataset.
Figure 4B:
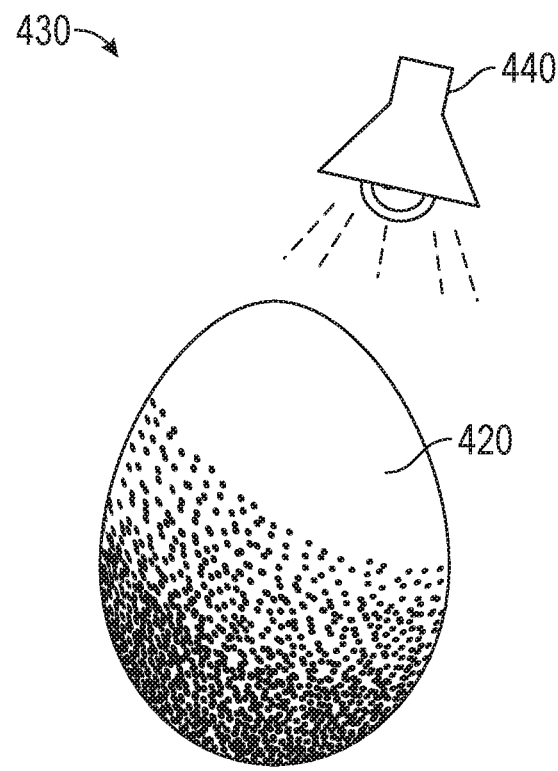
Figure 4C:
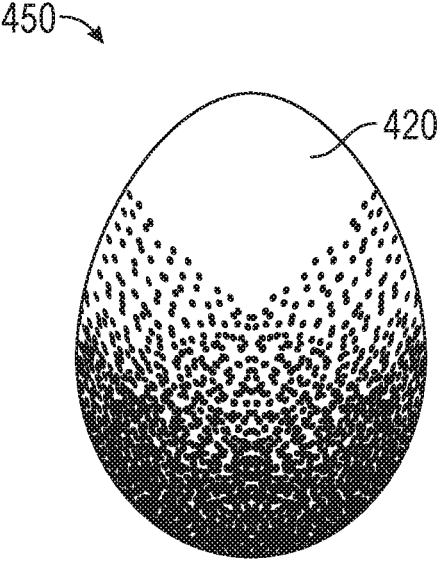

FIGS. 4A-C illustrate an exemplary process for dynamic visualization a three-dimensional object based on a volumetric dataset when a user is manipulating the visualization. In particular, FIGS. 4A-C illustrate different images of the three-dimensional object created based on the volumetric dataset and different light vectors.

FIG. 4A represents an intermediate image 400 including a light source 410 and a three-dimensional object 420. To generate the intermediate image 400 a computer system accesses the volumetric dataset representing the object 420 and applies a light source 410 to the dataset to provide shading, e.g., via a shadow map as described above. Similarly, FIG. 4B represents an intermediate image 430 including a light source 440 and the three-dimensional object 420, where light source 440 is at a different relative position to three-dimensional object 420. To generate the intermediate image 430, the computer system accesses the volumetric dataset representing the object 420 and applies light source 440 to the dataset to provide shading for this configuration, e.g., via a shadow map as described above.

In some embodiments, light source 410 and light source 440 provide different pluralities of light rays to object 420. The different pluralities of light rays present different characteristics when applied to the dataset representing the object 420. In some embodiments, light source 410 and light source 440 are oriented differently with regard to the object 420 and thus, the plurality of light rays provided by the light sources 410 and 440 interact with the dataset representing the object 420 differently. For example, light source 410 may be oriented directly above of object 420, causing the lower half of object 420 to be shadowed, while light source 440 may be oriented more to the right of object 420, causing the shadowed area of object 420 to shift to the left. In some embodiments, light source 410 and light source 440 may be placed different distances from object 420 or may have different intensities. In some embodiments, light source 410 and light source 440 may have other characteristics that are different, including the type of light they are intended to model or the color of the light they are intended to model. Further, in some examples, at least one of light source 410 and light source 440 may be used to model a surface or object reflecting light toward object 420.

FIG. 4C represents an accumulated image 450 including object 420. Accumulated image 450 is created by blending intermediate image 400 and intermediate image 430 to create accumulated image 450 that incorporates the lighting effects of both light source 410 and light source 440 on object 420. In some embodiments, blending intermediate image 400 and intermediate image 430 includes averaging intermediate image 400 and intermediate image 430 together to create accumulated image 450. In some embodiments, accumulated image 450 is displayed on an output device.

After accumulated image 450 has been generated the computer system may determine whether a user has manipulated accumulated image 450 within a predetermined amount of time. For example, the user may manipulate object 420 within image 450 to change the view that is displayed to the user. Accordingly, accumulated image 450 may update so that the view the user desires is shown. The computer system blends intermediate image 400 and intermediate image 430 based on the manipulated view to update accumulated image 450.

In some embodiments, updating the accumulated image may be configured by changing a rate of display. For example, the rate of display may indicate a speed for displaying (e.g., displaying 2 images per millisecond or second), or may indicate a time gap between displaying two images (e.g., a time gap of 10 milliseconds). It is appreciated that the rate of displaying can have any desired value for enhancing or optimizing the manipulation and generation of the accumulated image.

In some embodiments, while a user is manipulating the visualization of the three-dimensional object, accumulated image 450 is generated by applying a predetermined number of light sources. For example, accumulated image 450 may be generated by blending two, three, four, or any other feasible number of intermediate images, each intermediate image generated to display the effects of an individual light source on object 420. In some embodiments, the predetermined number of light sources is set according to processing limitations so that the visualization of the three-dimensional object may continue to be manipulated. For example, a computer system may contain a limited number of processors and thus processing power and so to ensure that a user may continue to manipulate the three-dimensional object, two different light sources are modeled and thus two intermediate images are used to generate accumulated image 450. In some embodiments, the number of light sources may be selected by a user before displaying the visualization of the three-dimensional object for manipulation.

In some embodiments the predetermined amount of time is set by the user. In some embodiments the predetermined amount of time is determined based on the volumetric dataset. In some embodiments, the predetermined amount of time is determined based on the type of object being represented by the volumetric dataset.

In some embodiments, generating each of the intermediate images includes generating a shadow map based on the amount of light applied by the light rays of each light source and a vector indicative of the surface normal with the ray direction of the light ray.

Figure 5A:
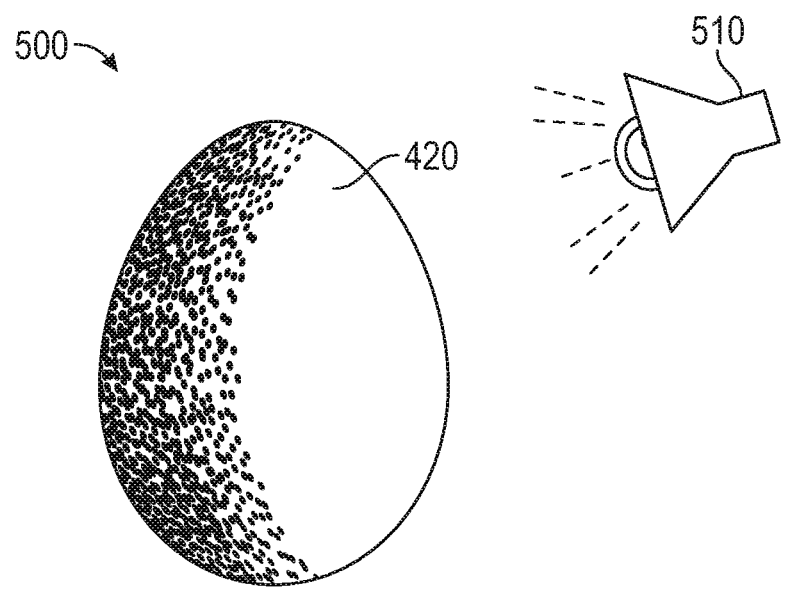
FIGS. 5A-B illustrate an exemplary process for dynamic visualization a three-dimensional object based on a volumetric dataset when a user stops manipulating the dataset for a predetermined time.
Figure 5B:
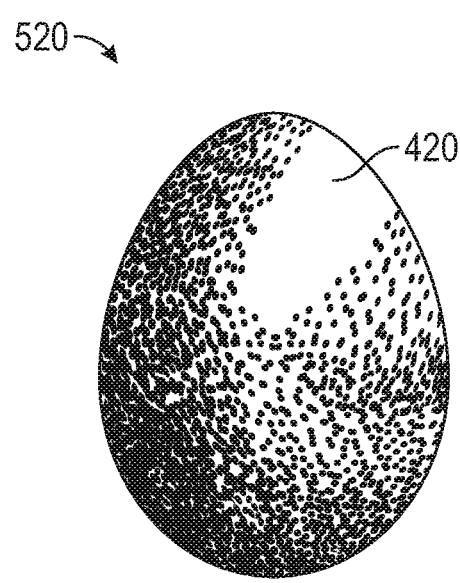

FIGS. 5A-B illustrate an exemplary process for dynamic visualization a three-dimensional object based on a volumetric dataset when a user stops manipulating the visualization.

FIG. 5A represents an intermediate image 500 including a light source 510 and three-dimensional object 420. Similarly to intermediate images 400 and 430 presented in the previous example, intermediate image 500 is generated by a computer system that accesses the volumetric dataset representing the object 420 and applies light source 510 to the dataset to provide shading, e.g., via a shadow map as described above. FIG. 5B represents an accumulated image 520 which is generated by blending intermediate image 500 with previous intermediate images 400 and 430. In some embodiments, blending intermediate image 500, intermediate image 400, and intermediate image 430 includes averaging intermediate images 500, 400, and 430 to create accumulated image 520.

FIGS. 5A-B represent steps in a process that may be repeated any number of times. Each time, a light source different than those previously applied is applied to the volumetric dataset representing object 420 to generate an intermediate image. The resulting intermediate image may then be blended with the previous intermediate images to create a new accumulated image that includes the effects of all of the light sources applied to the volumetric dataset representing object 420. This may be repeated any number of times to add any number of different light sources to the accumulated image, adding more detail and providing a more realistic image. In some embodiments, each light source includes a plurality of light rays.

In some embodiments, the number of light sources is a predetermined amount. In some embodiments, the predetermined number of light sources is based on the object that the volumetric dataset represents. In some embodiments, the predetermined number of light sources is based on the amount of processing power available. In some embodiments, the predetermined number of light sources is set by a user before generating the images.

In some embodiments, blending the intermediate images includes blending new intermediate images with the previously generated accumulated image. For example, new accumulated image 520 may be generated by blending intermediate image 500 with previously accumulated image 450. Blending new intermediate images with the previously generated accumulated image may be performed by calculating the 1/n contribution of the new intermediate image to the accumulated image, applying the (n−1)/n modulated weight to the prior accumulated image and adding the 1/n contribution to the (n−1)/n modulated weight, where n is equal to the total number of images. In this manner all n images will contribute 1/n to the new accumulated image. For example, if the new intermediate image is the $10^{th}$ image generated the 1/10 contribution of the new intermediate image can be added to the 9/10 modulated weight of the prior accumulated image to create the new accumulated image made up of 1/10 of each intermediate image.

In some embodiments, a user may start manipulating the accumulated image again after additional intermediate images have been added to the accumulated image. If the computer system determines that a user has manipulated the accumulated image within a predetermined amount of time then the computer system will generate an accumulated image based on the light sources previously used when the user was manipulating the image. For example, the computer system may generate an accumulated image based on two light sources. The user may manipulate this image, causing the computer system to update the accumulated image, using the intermediate images generated based on the two light sources. The user may then stop manipulating the image and the computer system may determine that the manipulation has not occurred within a predetermined amount of time. After the predetermined amount of time has passed the computer system may begin to add additional light sources and thus intermediate images to the accumulated image one at a time. At some point while the additional light sources are being added the user may again manipulate the accumulated image. The computer system will then generate an accumulated image based on the user's manipulation and the original two light sources. This accumulated image may continue to be updated while the user manipulates the accumulated image. If the user does not manipulate the accumulated image within a predetermined amount of time, then the computer system may again add additional light sources and thus intermediate images over time.

In some embodiments, the various parameter used to apply the various light sources and generate the various images are referred to as visualization parameters. In some embodiments, the computer system can obtain the visualization parameters from a user, a database, and/or use default configurations. For example, the computer system can provide a user interface (e.g., user interface 117) for obtaining user inputs of one or more visualization parameters. The computer system can also store previously obtained visualization parameters in a database (e.g., visualization data 119) of memory 115, RAM 113, Rom 114, and/or any other storage devices. By storing the visualization parameters, the computer system enables re-using of the same or similar sets of visualization parameters for the next dynamic visualization of a representation of a three dimensional object. For example, for identification of an additional or a new three dimensional object, the computer system may allow retrieving and/or reloading of visualization parameters that are previously used or provided. In some embodiments, the computer system can determine or detect that no user input is provided with respect to the visualization parameters. The computer system can thus use a default setting or configuration for the next dynamic visualization.

Generating an accumulated image in this manner provides several benefits over conventional dynamic visualization systems. In particular, conventional dynamic visualization systems often employ stochastic monte carlo lighting which randomly applies different light sources to an object to produce an image that is an approximation of how light would be applied in the real world. This random application can be inconsistent and produce some images that appear to be unrealistic or introduce flaws that are undesirable.

Using the process for dynamic visualization described herein provides a more realistic image while providing a user friendly and efficient interface. In particular, by limiting the number of light sources used to generate the image while a user is manipulating the image, the process ensures that a user is able to continue to manipulate and understand the image without a large increase in processing power. Further, limiting the number of light sources while manipulating the image decreases on the amount of blur introduced to the image and allows the user to clearly perceive the desired image. By introducing additional light sources gradually after the user has stopped manipulating the image, more and more detail and realism is added to the picture presenting details that may not be observed when using a conventional stochastic monte carlo process. Additionally, this process provides greater efficiency to the computer system, by only using the processing power required to add each additional image gradually, and reducing the consumption of power when the user manipulates the image.

Further, because this process is gradual the user may determine for themselves when enough detail has been added and a different view of the object would be useful. By providing the user with more realistic images, the user may gain a better understanding of the object. As previously discussed, this is especially true important in fields such as medical imaging, which rely on visualization of three-dimensional objects to aid physicians in locating, diagnosing, and treating conditions that are not readily visible to the naked eye. Accordingly, the process of dynamic visualization described herein is more efficient, user-friendly, and produces more realistic visualizations than many systems currently used.

Figure 6:
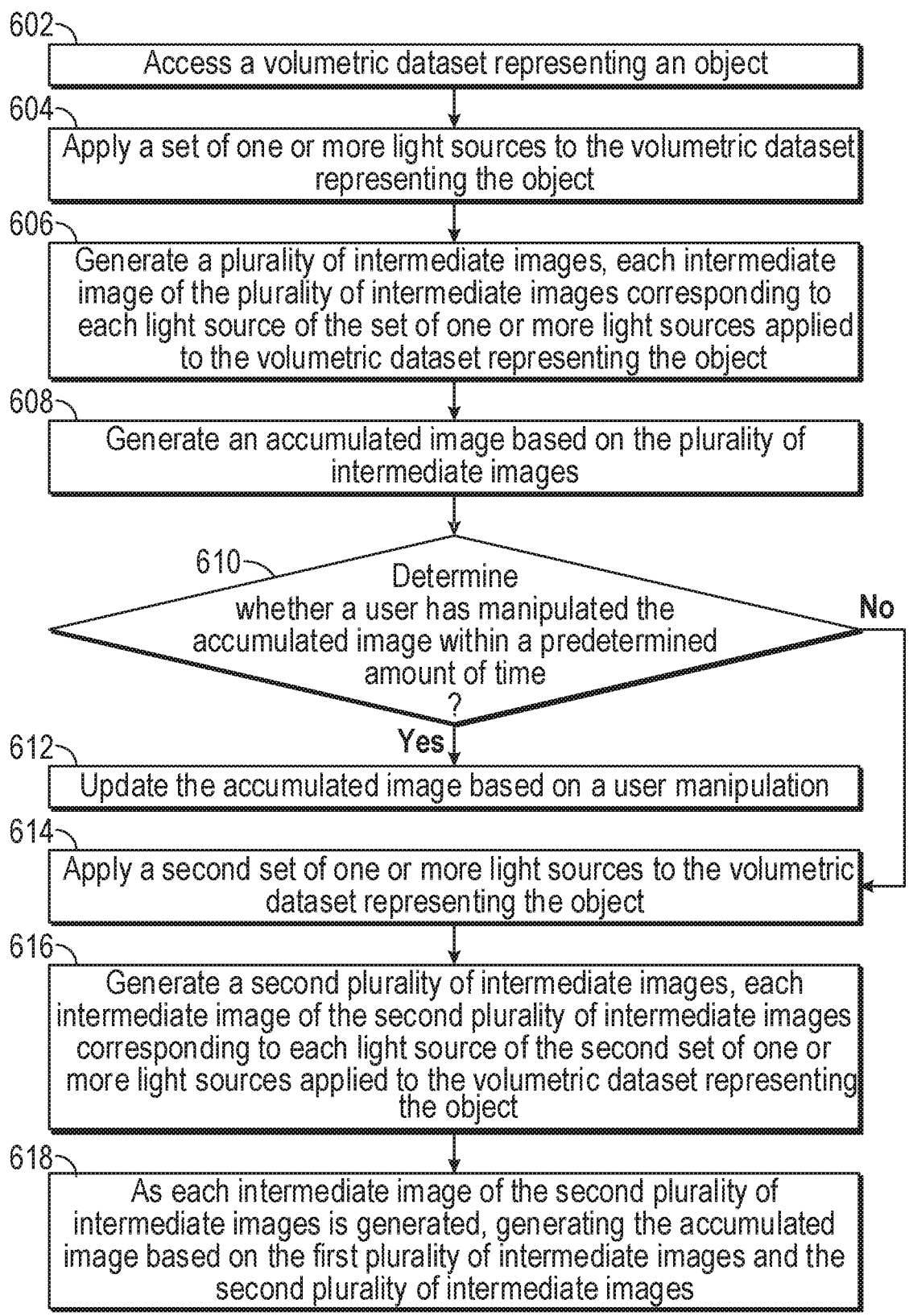
FIG. 6 illustrates a flow chart of an exemplary process for dynamic visualization of a three-dimensional object, consistent with some embodiment of the present disclosure.

FIG. 6 illustrates a flow chart of an exemplary process for dynamic visualization of a three-dimensional object, consistent with some embodiment of the present disclosure. At step 602, a computer system access a volumetric dataset representing an object (e.g., object 420).

At step 604, the computer system applies a set of one or more light sources to the volumetric dataset representing the object. In some embodiments, each of the one or more light sources (e.g., light source 410 or 440) includes a plurality of light rays. In some embodiments, each light source represented of the set of one or more light sources has a different orientation. In some embodiments the set of one or more light sources is limited to a predetermined number of light sources.

At step 606, the computer system generates a plurality of intermediate images (e.g., intermediate images 400 and 430), each intermediate image of the plurality of intermediate images corresponding to each light source of the set of one or more light sources applied to the volumetric dataset representing the object. In some embodiments, generating the plurality of intermediate images further comprises determining a shadow map based on an amount of light applied at a plurality of points of the volumetric data set representing the object and a surface normal with a ray direction from the light source for each of the intermediate images (e.g., as illustrated by FIG. 3).

At step 608, the computer system generates an accumulated image (e.g., accumulated image 450) based on the plurality of intermediate images (e.g., intermediate images 400 and 430). In some embodiments the accumulated image is generated by averaging the plurality of intermediate images.

At step 610, the computer system determines whether a user has manipulated the accumulated image (e.g., accumulated image 450) within a predetermined amount of time.

At step 612, in accordance with a determination that the user has manipulated the accumulated image (e.g., accumulated image 450) within a predetermined amount of time, the computer system updates the accumulated image based on a user manipulation.

At step 614, in accordance with a determination that the user has not manipulated the accumulated image (e.g., accumulated image 450) within a predetermined amount of time, the computer system applies a second set of one or more light sources to the volumetric data set representing the object (e.g., object 420). In some embodiments, the second set of one or more light sources includes more light sources than the first set of one or more light sources.

At step 616, the computer system generates a second plurality of intermediate images (e.g., intermediate image 500), each intermediate image of the second plurality of intermediate images corresponding to each light source of the second set of one or more light sources applied to the volumetric dataset representing the object.

At step 618, as each intermediate image of the second plurality of intermediate images is generated, the computer system generates the accumulated image (e.g., accumulated image 520) based on the first plurality of intermediate images (e.g., intermediate images 400 and 430) and the second plurality of the intermediate images (e.g., intermediate image 500). In some embodiments, generating the accumulated image based on the first plurality of intermediate images and the second plurality of intermediate images further comprises averaging all of the images of the first plurality of intermediate images and the second plurality of intermediate images.

In some embodiments, in accordance with a determination that the user has not manipulated the accumulated image within a predetermined amount of time, the computer system detects a user manipulation of the accumulated image; and in response to detecting the user manipulation of the accumulated image generates the accumulated image based on the first plurality of intermediate images; and updates the accumulated image based on the user manipulation of the accumulated image.

It should be noted that, despite references to particular computing paradigms and software tools herein, the computer program instructions with which embodiments of the present subject matter may be implemented may correspond to any of a wide variety of programming languages, software tools and data formats, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities may be effected or employed at different locations. In addition, references to particular algorithms herein are merely by way of examples. Suitable alternatives or those later developed known to those of skill in the art may be employed without departing from the scope of the subject matter in the present disclosure.

It will be understood that, although the terms "first," "second," etc. may be used herein to describe various elements, these elements should not be limited by these terms. These terms are only used to distinguish one element from another. For example, a first 3D object could be termed a second 3D object, and, similarly, a second 3D object could be termed a first 3D object, without changing the meaning of the description, so long as all occurrences of the "first 3D object" are renamed consistently and all occurrences of the "second 3D object" are renamed consistently. The first 3D object and the second 3D object are both 3D objects, but they are not the same 3D objects.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

The invention claimed is:

1. A method for dynamic visualization of a representation of a three-dimensional object, comprising:
at a computer system including one or more processors and memory:
accessing a volumetric dataset representing the object;
applying a set of one or more light sources to the volumetric dataset representing the object;
generating a plurality of intermediate images, each intermediate image of the plurality of intermediate images corresponding to each light source of the set of one or more light sources applied to the volumetric dataset representing the object;
generating an accumulated image based on the plurality of intermediate images;
determining whether a user has manipulated the accumulated image within a predetermined amount of time; and
in accordance with a determination that the user has not manipulated the accumulated image within a predetermined amount of time:
applying a second set of one or more light sources to the volumetric data set representing the object;
generating a second plurality of intermediate images, each intermediate image of the second plurality of intermediate images corresponding to each light source of the second set of one or more light sources applied to the volumetric data-set representing the object; and
as each intermediate image of the second plurality of intermediate images is generated, generating the accumulated image based on the first plurality of intermediate images and the second plurality of intermediate images.

2. The method of claim 1, wherein the set of one or more light sources is a first set of one or more light sources and wherein the plurality of intermediate images is a first plurality of intermediate images further comprising:
in accordance with a determination that the user has manipulated the accumulated image within a predetermined amount of time, updating the accumulated image based on a user manipulation.

3. The method of claim 1, wherein each light source of the set of one or more light sources includes a plurality of light rays.

4. The method of claim 1, wherein each light source of the set of one or more light sources has a different orientation.

5. The method of claim 1, wherein at least one light source of the set of one or more light sources models a surface reflecting or transmitting light to the object.

6. The method of claim 1, wherein the set of one or more light sources is limited to a predetermined number of light sources.

7. The method of claim 1, wherein generating the plurality of intermediate images further comprises determining a shadow map based on an amount of light applied at a plurality of points of the volumetric data set representing the object and a surface normal with a ray direction from the light source for each of the intermediate images.

8. The method of claim 1, wherein generating the accumulated image based on the plurality of intermediate images further comprises averaging the plurality of intermediate images.

9. The method of claim 1, wherein the second set of one or more light sources includes more light sources than the first set of one or more light sources.

10. The method of claim 1, wherein generating the accumulated image based on the first plurality of intermediate images and the second plurality of intermediate images further comprises averaging all of the intermediate images of the first plurality of intermediate images and the second plurality of intermediate images.

11. The method of claim 1, further comprising:
in accordance with a determination that the user has not manipulated the accumulated image within a predetermined amount of time:
detecting a user manipulation of the accumulated image; and
in response to detecting the user manipulation of the accumulated image:
generating the accumulated image based on the first plurality of intermediate images; and
updating the accumulated image based on the user manipulation of the accumulated image.

12. A non-transitory computer readable medium having instructions stored thereon, the instructions, when executed by one or more processors of a computer system, cause the computer system to:
- access a volumetric dataset representing the object;
- apply a set of one or more light sources to the volumetric dataset representing the object;
- generate a plurality of intermediate images, each intermediate image of the plurality of intermediate images corresponding to each light source of the set of one or more light sources applied to the volumetric dataset representing the object;
- generate an accumulated image based on the plurality of intermediate images;
- determine whether a user has manipulated the accumulated image within a predetermined amount of time; and
- in accordance with a determination that the user has not manipulated the accumulated image within a predetermined amount of time:
  - apply a second set of one or more light sources to the volumetric data set representing the object;
  - generate a second plurality of intermediate images, each intermediate image of the second plurality of intermediate images corresponding to each light source of the second set of one or more light sources applied to the volumetric data-set representing the object; and
  - as each intermediate image of the second plurality of intermediate images is generated, generate the accumulated image based on the first plurality of intermediate images and the second plurality of intermediate images.

13. A system for dynamic visualization of a representation of a three-dimensional object, comprising:
- one or more processors; and
- memory having instructions stored thereon, the instruction, when executed by the one or more processors, cause the computer system to:
  - access a volumetric dataset representing the object;
  - apply a set of one or more light sources to the volumetric dataset representing the object;
  - generate a plurality of intermediate images, each intermediate image of the plurality of intermediate images corresponding to each light source of the set of one or more light sources applied to the volumetric dataset representing the object;
  - generate an accumulated image based on the plurality of intermediate images;
  - determine whether a user has manipulated the accumulated image within a predetermined amount of time; and
  - in accordance with a determination that the user has not manipulated the accumulated image within a predetermined amount of time:
    - apply a second set of one or more light sources to the volumetric data set representing the object;
    - generate a second plurality of intermediate images, each intermediate image of the second plurality of intermediate images corresponding to each light source of the second set of one or more light sources applied to the volumetric data-set representing the object; and
    - as each intermediate image of the second plurality of intermediate images is generated, generate the accumulated image based on the first plurality of intermediate images and the second plurality of intermediate images.

* * * * *